US008659591B2

(12) United States Patent
Devane (10) Patent No.: US 8,659,591 B2
(45) Date of Patent: Feb. 25, 2014

(54) METHOD OF AND SYSTEM FOR IMAGE PROCESSING

(76) Inventor: Peter Devane, Wellington (NZ)

( * ) Notice: Subject to any disclaimer, the term of this patent is extended or adjusted under 35 U.S.C. 154(b) by 814 days.

(21) Appl. No.: 12/438,721

(22) PCT Filed: Aug. 13, 2007

(86) PCT No.: PCT/NZ2007/000214
§ 371 (c)(1),
(2), (4) Date: Aug. 5, 2010

(87) PCT Pub. No.: WO2008/023995
PCT Pub. Date: Feb. 28, 2008

(65) Prior Publication Data
US 2010/0289795 A1    Nov. 18, 2010

(30) Foreign Application Priority Data

Aug. 25, 2006   (NZ) ........................................ 549464

(51) Int. Cl.
*G06T 19/00* (2011.01)
(52) U.S. Cl.
USPC ............................ 345/419; 345/426; 345/427
(58) Field of Classification Search
CPC ............ G06T 7/60; G06T 15/00; G06T 15/10
USPC .......... 345/419, 427, 156, 426; 382/294, 158, 382/916, 154; 600/443
See application file for complete search history.

(56) References Cited

U.S. PATENT DOCUMENTS

| | | | | |
|---|---|---|---|---|
| 4,977,505 A | * | 12/1990 | Pelizzari et al. | 600/425 |
| 5,760,786 A | * | 6/1998 | Marks et al. | 345/441 |
| 6,245,017 B1 | * | 6/2001 | Hashimoto et al. | 600/447 |
| 7,907,774 B2 | * | 3/2011 | Parr et al. | 382/154 |
| 7,907,793 B1 | * | 3/2011 | Sandrew | 382/284 |
| 2007/0276225 A1 | * | 11/2007 | Kaufman et al. | 600/416 |
| 2011/0019797 A1 | * | 1/2011 | Morton | 378/57 |

FOREIGN PATENT DOCUMENTS

CN    1452946 A    11/2003

OTHER PUBLICATIONS

Gong et al. "Multi-resolution Genetic Algotithm and its application in Motion Estimation", IEEE 2002.*
Tagliasacchi "Optical Flow Estimation usingGenetic Algorithms", 2006.*

* cited by examiner

*Primary Examiner* — Kimbinh T Nguyen
(74) *Attorney, Agent, or Firm* — Blakely, Sokoloff, Taylor & Zafman LLP (57) ABSTRACT

A method of correlating a representation of a body to a three dimensional representation of the body. A representation (such as a two dimensional image) of a body is acquired and a fitness function is generated for it. A two dimensional outline of the three dimensional representation of the body is then generated for a number of sets of three dimensional position and orientation values. These are compared to the fitness function to generate measures of fit for each set of three dimensional position and orientation values. New sets of position and orientation values are then bred using a genetic algorithm or other breeding algorithm. The method is repeated until the measure of fit converges to an acceptable solution. There is also disclosed a system for performing the method.

37 Claims, 8 Drawing Sheets

METHOD OF AND SYSTEM FOR IMAGE PROCESSING

This is a non-provisional application claiming the benefit of International application number PCT/NZ2007/000214 filed Aug. 13, 2007.

FIELD OF THE INVENTION

This invention relates to a method of image processing and particularly, although not exclusively, to a method of correlating a two dimensional representation of an object to a three dimensional representation of the object. Systems for effecting the methods are also disclosed. Whilst the method has particular application in medical imaging applications it is also applicable in a range of other fields such as machine vision, security etc.

BACKGROUND OF THE INVENTION

In a number of imaging applications it is desirable to correlate an acquired image with a previously acquired image or a virtual representation of an object. In some applications it is desirable to correlate a two dimensional image of an object to a three dimensional representation of the object. Conventional automated matching approaches require large processing capacity, which limits the application of this approach.

A number of techniques have been employed to monitor wear and migration of prostheses and bones. A leading technology involves the insertion of reference beads in prostheses and bones so that these reference points may be used when an image is acquired to determine the orientation of the prosthesis or bone. This approach is expensive and difficult for surgeons in requiring a number of beads to be inserted during a procedure. Due to the difficulty and expense this technique can only be used for a limited number of patients.

Various techniques for analysis of two dimensional images, such as x-rays, have been developed. Whilst these techniques enable wear to be calculated for a particular x-ray they rely upon the repeatability of image acquisition, which is difficult to achieve.

In a range of machine vision and robotic applications it would be desirable to rapidly correlate an acquired image of a body with one or more images representative of the or similar bodies. In particular it would be desirable to rapidly correlate an acquired two dimensional image of a body with one or more three dimensional representations of a real or virtual body.

It is an object of the invention to satisfy these needs or to at least provide the public with a useful choice.

Exemplary Embodiments

According to one exemplary embodiment there is provided a method of correlating a two dimensional representation of a body to a three dimensional representation of the body comprising:
 i. acquiring a two dimensional image of the body;
 ii. generating a fitness function for the two dimensional image;
 iii. determining two dimensional outlines of the three dimensional representation of the body for a plurality of sets of three dimensional position and orientation values;
 iv. comparing the two dimensional outlines to the fitness function to generate measures of fit for each set of three dimensional position and orientation values;
 v. breeding new sets of position and orientation values using a genetic algorithm; and
 vi. repeating steps iii to v until the measure of fit converges to an acceptable solution.

According to another exemplary embodiment there is provided a system for correlating a two dimensional representation of a body to a three dimensional representation of the body comprising:
 a. input means for acquiring a two dimensional image of the body; and
 b. processing means for:
   i. generating a fitness function for the two dimensional image;
   ii. determining a two dimensional outline of the three dimensional representation of the body for a first set of three dimensional position and orientation values;
   iii. comparing the two dimensional outline to the fitness function to generate a measure of fit;
   iv. breeding new position and orientation values using a genetic algorithm; and
   v. repeating steps iii to v until the measure of fit converges to an acceptable solution.

According to a further exemplary embodiment there is provided a method of correlating a two dimensional representation of an object to a three dimensional representation of the object comprising:
 i. acquiring a two dimensional image of the object;
 ii. generating a fitness function for the two dimensional image;
 iii. for a first set of three dimensional position and orientation values determining a two dimensional outline of the three dimensional representation of the object;
 iv. comparing the two dimensional outline to the fitness function to generate a measure of fit;
 v. generating new position and orientation values based on the first set of three dimensional position and orientation values and the measure of fit; and
 vi. repeating steps iii to v until the measure of fit converges to an acceptable solution.

According to a further exemplary embodiment there is provided a method of correlating a first representation of an object to a second representation of the object comprising:
 i. acquiring a first representation of the object;
 ii. generating a fitness function for the first representation;
 iii. for a first set of position and orientation values determining an outline of the second representation of the object;
 iv. comparing the outline to the fitness function to generate a measure of fit;
 v. generating new position and orientation values based on the first set of position and orientation values and the measure of fit; and
 vi. repeating steps iii to v until the measure of fit converges to an acceptable solution.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

In this specification the word "body" is used to refer to any object whether physical or biological or any part or combination thereof. Thus, in relation to a human body, a "body" may be one or more parts of a body, such as bones, or a prosthesis or a combination of such elements. In relation to a vision system a "body" may be any object or living thing or a part thereof or a combination thereof.

There is disclosed a method of correlating representations using a genetic algorithm. Whilst the method is described in relation to correlation of two and three dimensional representations it will be appreciated that the method is not limited to this exemplary embodiment.

Figure 1:
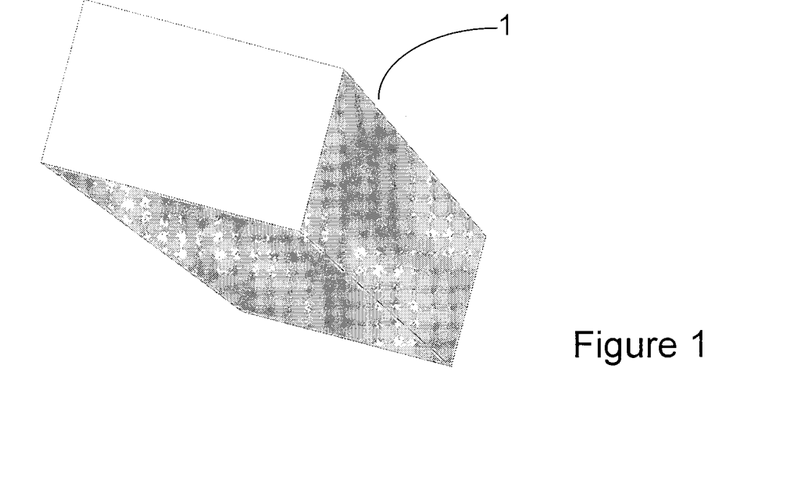
FIG. 1 shows an exemplary body.
Figure 2:
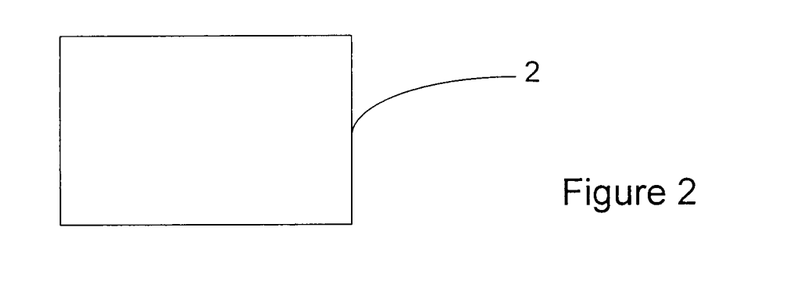
FIG. 2 shows a two dimensional acquired image of the body.
Figure 3:
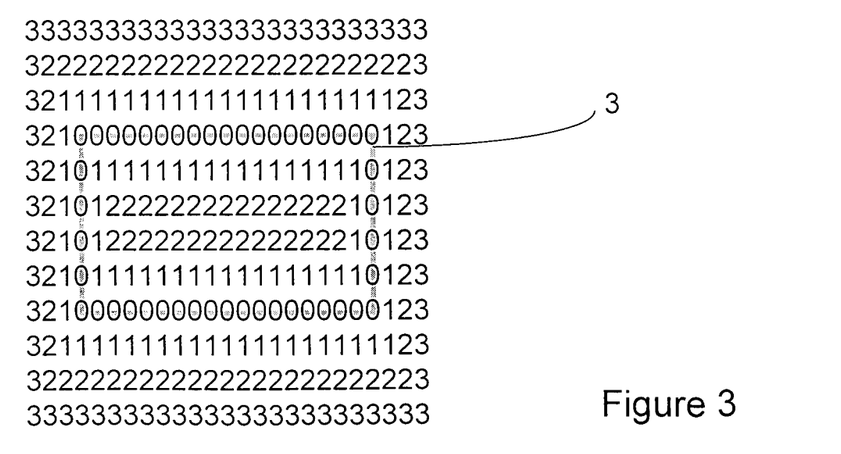
FIG. 3 shows a fitness function for the image shown in FIG. 2.

The general principals of the method will be illustrated with reference to FIGS. 1 to 9. FIG. 1 a perspective view of an exemplary body 1. FIG. 2 shows a view of the front face 2 of body 1 captured by a two-dimensional image capture device. The outline of face 2 is determined and a fitness function is developed for the outline as shown in FIG. 3. In FIG. 3 the outline 3 is shown in gray and the pixels on the outline are given the value zero. The surrounding pixels are given values related to the distance of a pixel from the outline. In the example shown the value of surrounding pixels is determined based on the number of pixels between a given pixel and the outline. However, the surrounding pixel values could be based on actual distance or some other function such as the square of the distance etc.

Whilst in this embodiment the outline of the two-dimensional image is used it will be appreciated that the fitness function could be based on the entire image or other parts of the image.

Figure 4:
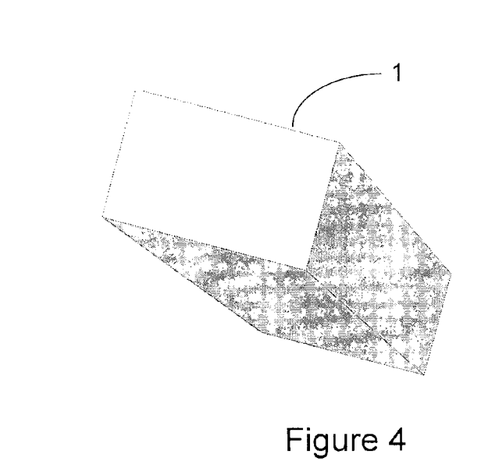
FIG. 4 shows a first position and orientation of the body shown in FIG. 1.
Figure 5:
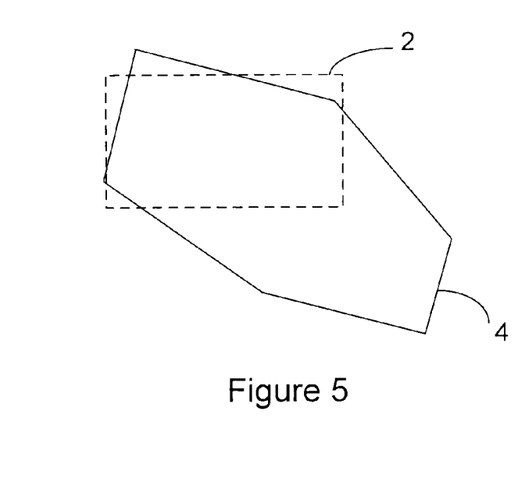
FIG. 5 shows an outline of the body shown in FIG. 4.
Figure 6:
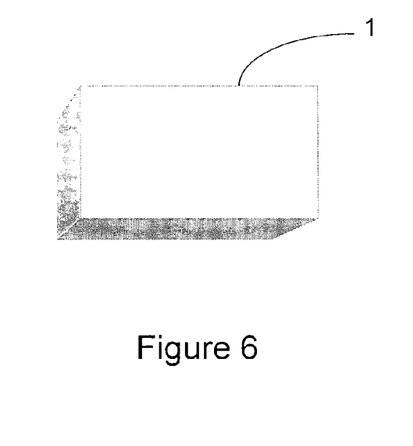
FIG. 6 shows a second position and orientation of the body shown in FIG. 1.
Figure 7:
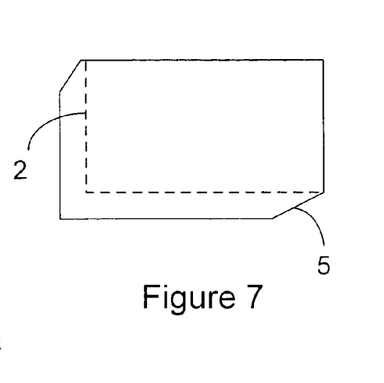
FIG. 7 shows an outline of the body shown in FIG. 6.
Figure 8:
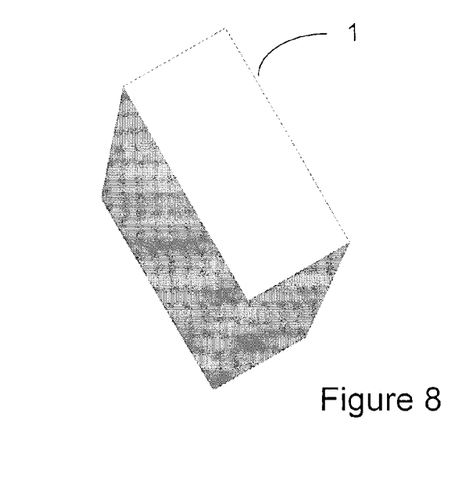
FIG. 8 shows a third position and orientation of the body shown in FIG. 1.
Figure 9:
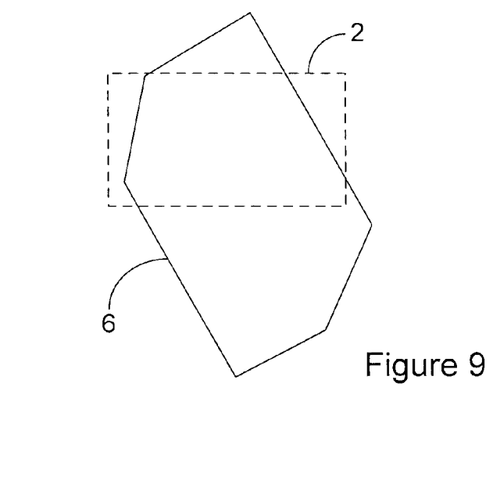
FIG. 9 shows an outline of the body shown in FIG. 6.

FIGS. 4, 6 and 8 show body 1 in various positions and orientations. In this example three sets of position (x, y and z) and three sets of orientation ($x_r$, $y_r$ and $z_r$) coordinates define the position and orientation in each case. In this example 3 sets of seed position and orientation values are generated which produce the positions and orientations shown in FIGS. 4, 6 and 8. The seed values are preferably generated by a random number generator. The random number generator is preferably a true random number generator rather than a pseudo random number generator. FIGS. 5, 7 and 9 show the outlines of the body 1 for the positions and orientations shown in FIGS. 4, 6 and 8. The outline 2 has been overlaid in FIGS. 5, 7 and 9 to illustrate the match in each case. It can be seen that the position and orientation of FIG. 7 is the closest to the desired online 2 and it will be appreciated that when comparing the outlines 4, 5 and 6 to the fitness function 3 that the outline shown in FIG. 7 will produce the lowest value (i.e. outline 5 can be positioned with respect to the fitness function shown in FIG. 3 to produce the lowest sum of pixels). It will be appreciated that a variety of iterative techniques may be used to compare each outline 4, 5 and 6 to fitness function three to determine the lowest value (i.e. the sum of pixel values of the fitness function corresponding to a pixel of the given outline).

The fitness of each set of values can be determined based on the results of comparison of each outline with the fitness function. In this case the result would be ranked from most fit to least fit in the order of FIG. 7, FIG. 5, FIG. 9. In a real example a much larger set of values would typically be employed; typically somewhere in the range of 100 to 1000 values. Based on the fitness of different sets of coordinates they may be bred to generate new sets of coordinates for the next iteration. Using the language of genetic algorithms each set of coordinates may be considered to be an "organism". Once the organisms are sorted from most fit to least fit various techniques may be employed to breed the next generation of organisms. Some examples include:

1. Best pick—a percentage of the best values are selected; typically less than 20%;
2. Linear—a proportion of the best values and a proportion of random values are selected;
3. Roulette—a pseudo random selection analogous to a roulette wheel weighted towards the fittest organisms; and/or
4. Elitist selection—some of the fittest values are attained for subsequent iterations.

Other breeding techniques may be used in place off or in conjunction with the above techniques. Further, supervisory programs may modify breeding between iterations. For example, if processing becomes stuck at a poor value then the rate of mutation may be increased or new random values may be inserted. It will be appreciated that the organisms may be contained within a single string from which the various coordinates can be extracted and the entire string may be manipulated under the control of the genetic algorithm.

Figure 10:
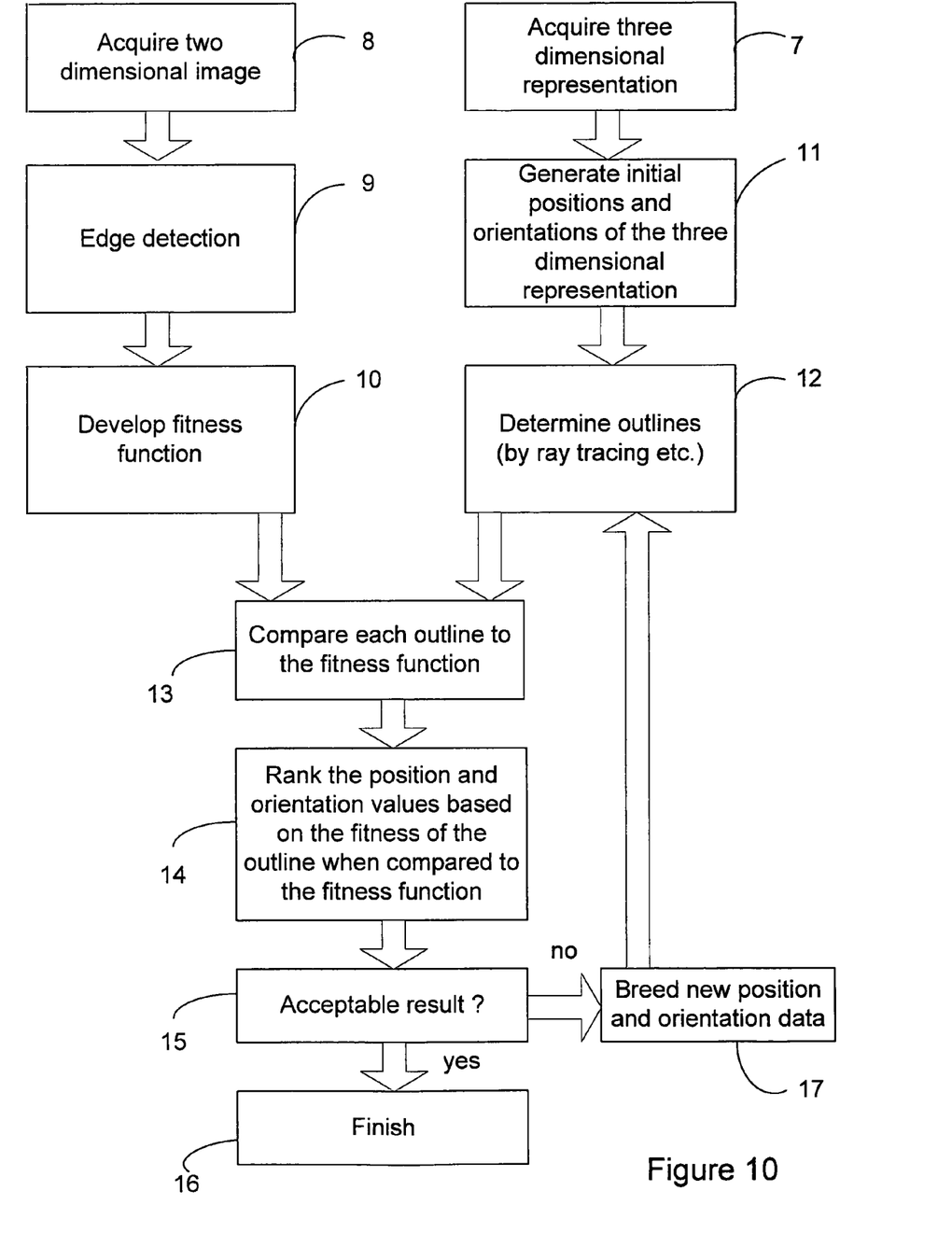
FIG. 10 shows a flow diagram illustrating an exemplary correlation method.

FIG. 10 illustrates the general sequence of operation. A three dimensional representation is initially generated or acquired in step 7. The three-dimensional representation may be acquired by an imaging device or generated using computer modeling techniques etc. A two-dimensional image is acquired in step 8. Two-dimensional image may be acquired by a camera, x-ray or other imaging device. The outline all the two-dimensional image may be determined by edge detection or other suitable methods. Alternatively, the entire image or other parts of the image may be used to develop a fitness function. In step 10 a fitness function is generated based on the outline or other image part. A series of coordinates defining the position and orientation of the three-dimensional image are generated in step 11. These are preferably generated by a true random number generator. The outlines of the three-dimensional representation for each set of position and orientation coordinates are determined in step 12. Each outline generated in step 12 is then compared in step 13 with the fitness function generated in step 10. The values are then ranked in step 14 based on fitness. If an acceptable result is achieved processing finishes in step 16 and, if not, new values are bred in step 17 and processing continues iteratively until an acceptable result is achieved.

An acceptable result may be achieved when the value of comparison of an outline with the fitness function is within a prescribed range. Alternatively, it may be required that a fitness within a prescribed range is achieved for a number of iterations to ensure stability.

A supervisory function may ensure that processing proceeds in a desired manner. A supervisory function may limit the computational resource allowed for the process and force a result if a computational budget has been expended and the result is within an acceptable range. The supervisory function may also control mutation and increase the rate of mutation if the fitness of organisms remains too low for too long.

Figure 11:
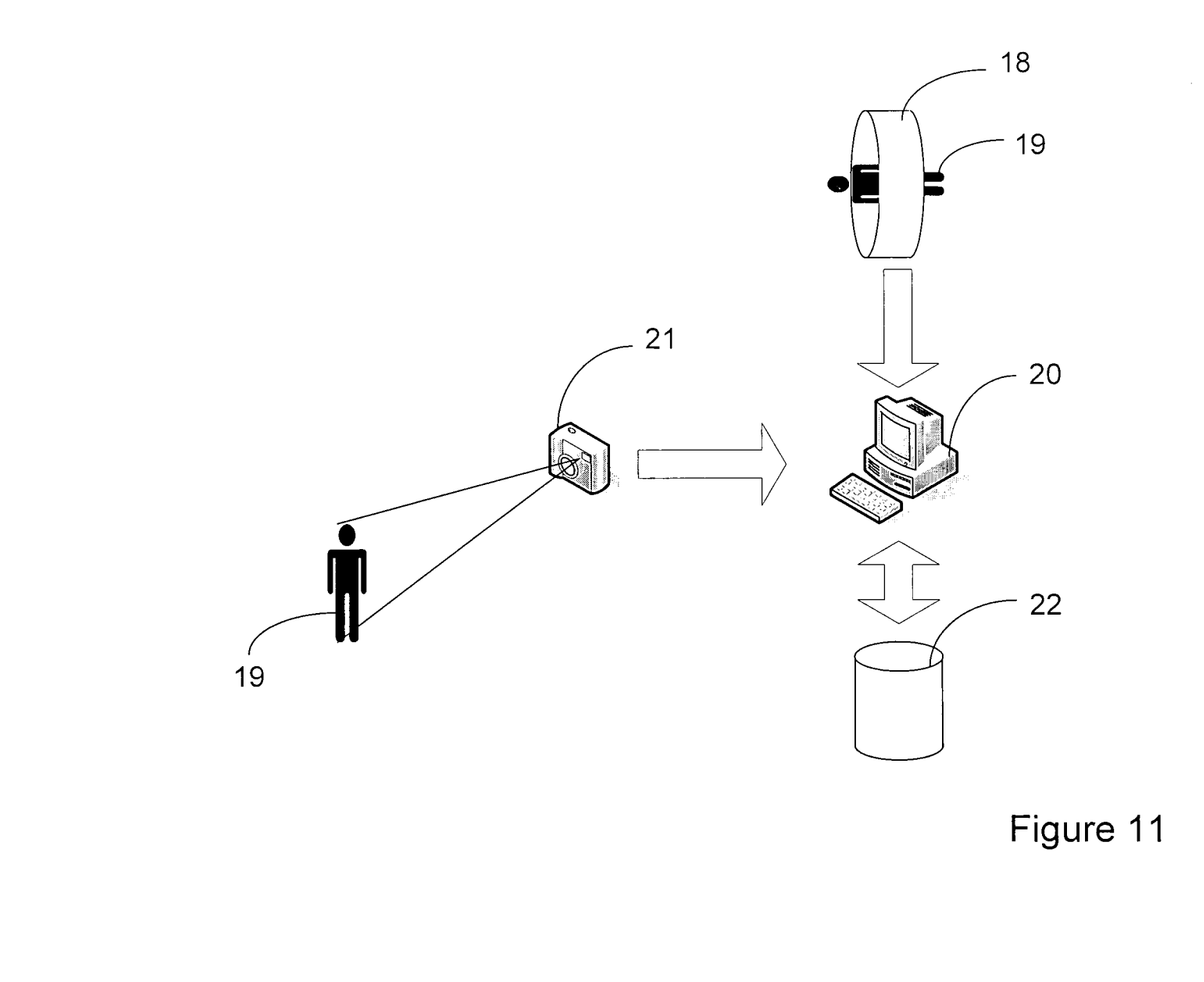
FIG. 11 shows a schematic diagram of an imaging system according to one exemplary embodiment.

Referring now to FIG. 11 an example of a medical imaging system will be described. A three-dimensional imaging device 18 such as a CT scan, MRI scan, ultrasound scan etc. acquires a three-dimensional representation of a patient 19 and supplies this to computer system 20. A two-dimensional imaging device 21, which may be a camera, x-ray, CT scanner etc., acquires a two-dimensional image and provides this to computer system 20. Computer system 20 may also have access to a database 22 of virtual three-dimensional bodies, such as prostheses etc. Virtual three-dimensional bodies may be created using computer applications or may use partial real information, such as a sequence of x-rays, and smooth or otherwise generate a virtual model based upon the limited real world data. An acquired three dimensional representation and/or bodies from the database may be used depending upon the body to be compared.

Figure 12:
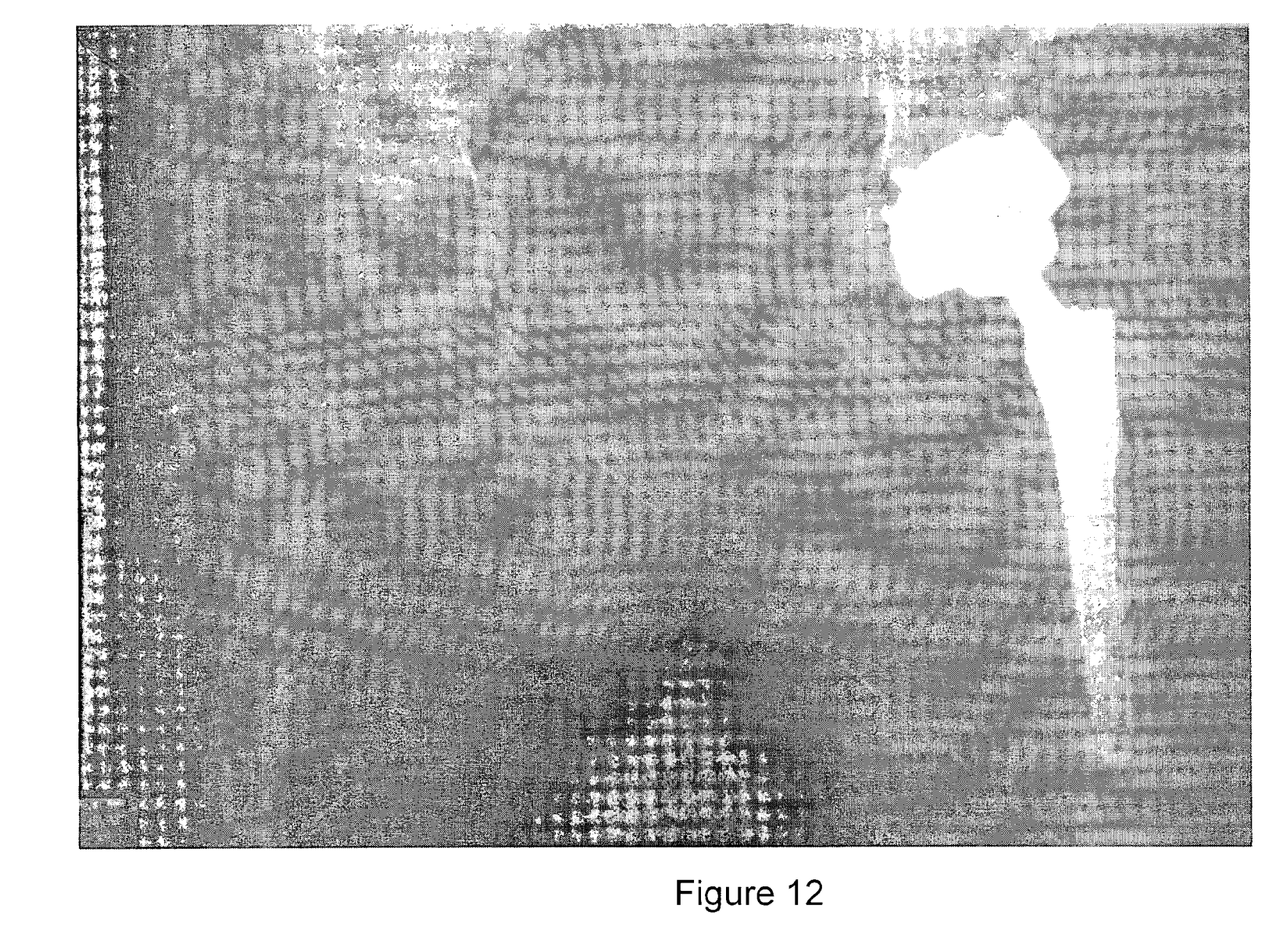
FIG. 12 shows an x-ray of a hip, femur and prosthesis.
Figure 13:
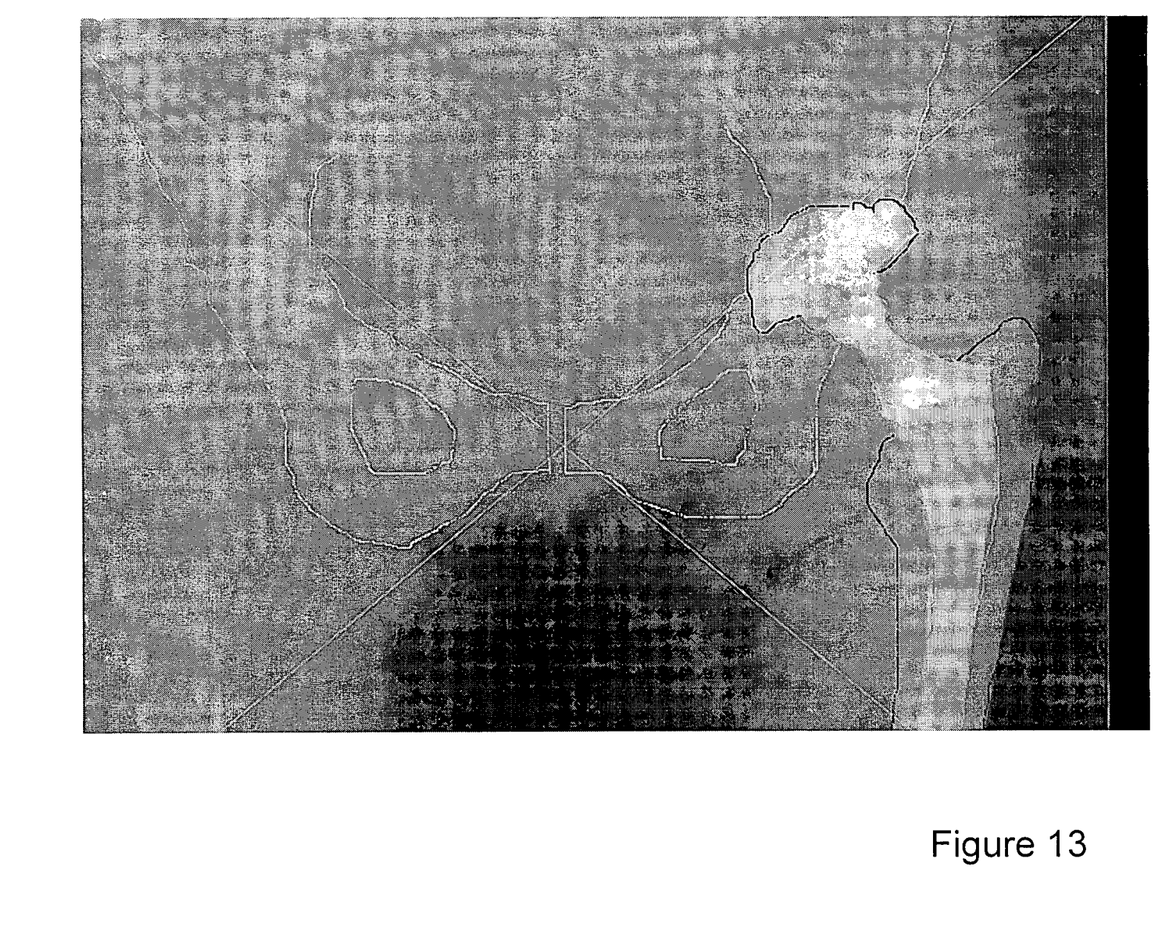
FIG. 13 shows the image of FIG. 10 with the outlines of the hip, femur and prosthesis identified.
Figure 14:
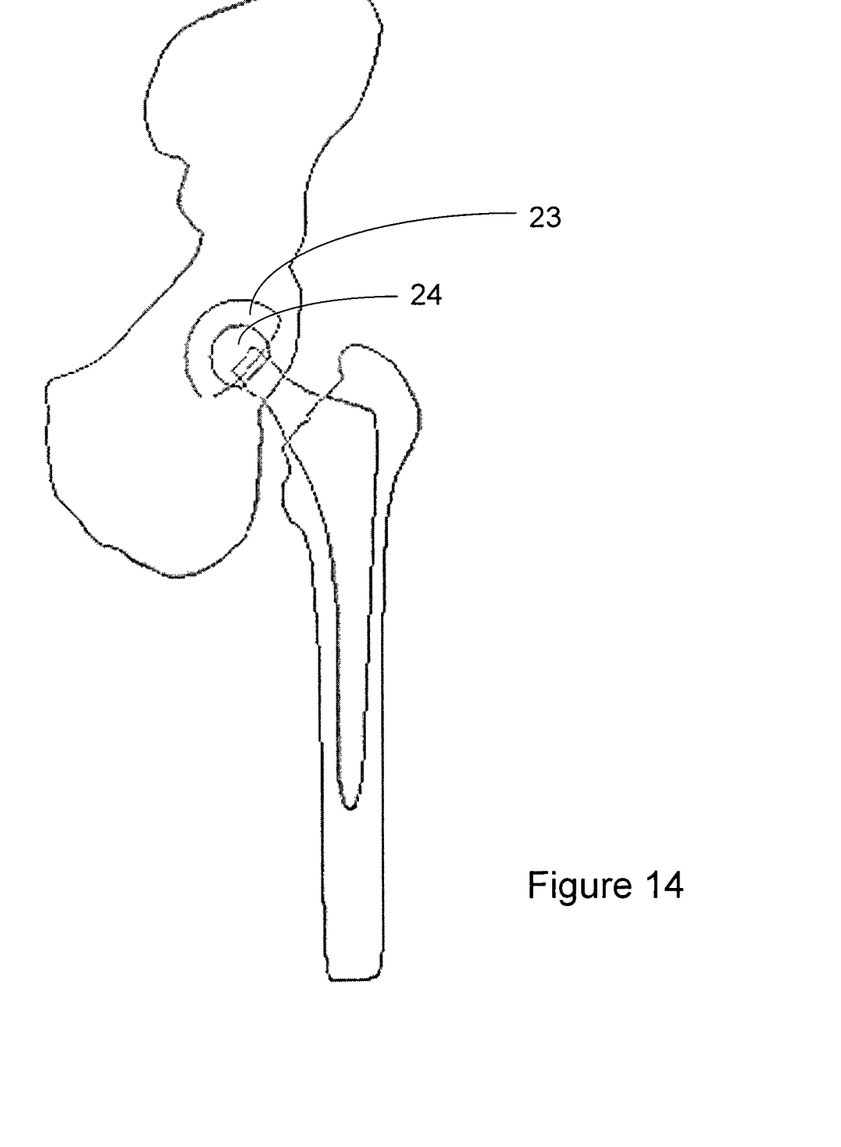
FIG. 14 shows the outlines of the hip, femur and prosthesis.

FIG. 12 shows an x-ray of a hip joint having a prosthesis fitted. Applying the method disclosed above outlines of the various bodies are determined using a suitable edge detection algorithm or the like as shown in FIG. 13. Knowing the exact shapes of the prostheses best fit algorithms may be used to identify the cup 23 and ball 24 of the prostheses as shown in FIG. 14. The techniques disclosed in the applicant's New Zealand patent specification No. 531745, annexed hereto as "Appendix A" may be utilised as appropriate in this method.

Figure 15:
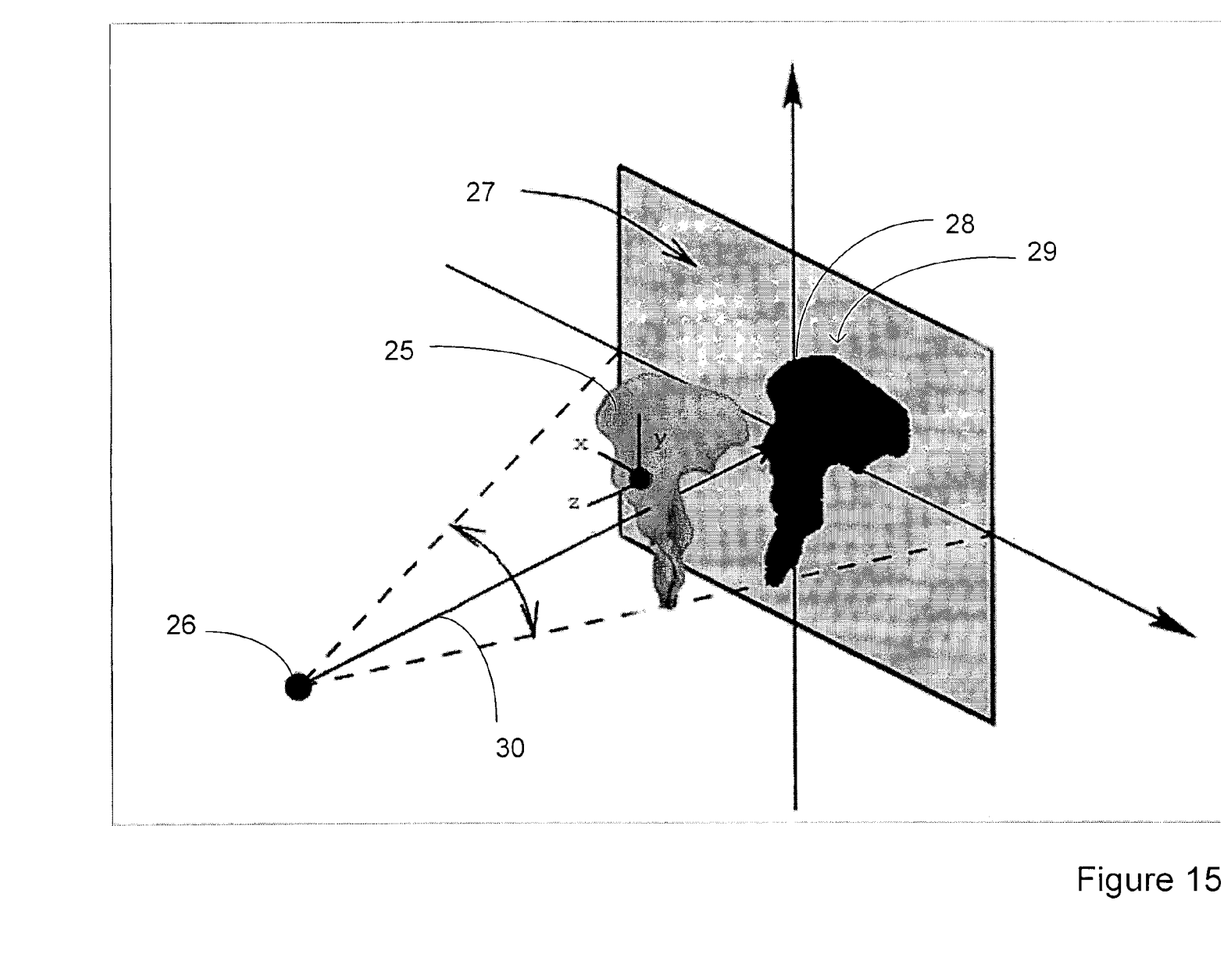
FIG. 15 illustrates a method of determining the outline of a three dimensional model using ray tracing.

FIG. 15 illustrates a ray tracing method for determining the outline of a three-dimensional representation for given position and orientation coordinates. Body 25 is located with respect to beam source 26 and image plane 27 based on its position and orientation coordinates. A ray is traced from the beam source 26 through the body to image plane 27 and is stepped outwardly until a ray 30 is at an edge 28 of body 25. Rays are then traced for the surrounding pixels to find an adjacent bounding pixel to pixel 28. This process continues around the periphery until an entire outline is produced.

The position of the three-dimensional representation 25 with respect to the beam source 26 and image plane 27 will affect the scale of outline 29 produced. Where the imaging conditions are known (e.g. relative positions of x-ray equipment) the correct positioning of the three-dimensional representation 25 may be determined. Where the body 25 is a prostheses its dimensions may be obtained from database 22 and the resulting outline 29 scaled accordingly.

In this example the initial position and orientation values may be selected randomly within prescribed ranges (as it will be known that foreign x-ray bodies will have orientations within prescribed ranges). In this example outlines may be generated from two perspectives with respect to body 25 enabling simultaneous comparison with x-rays from different perspectives (i.e. AP and lateral x-rays).

Otherwise, a genetic algorithm may be employed to determine the best position and orientation values for body 25 to generate an outline 29 for comparison with the acquired two-dimensional images as described in relation to FIGS. 1 to 10.

By comparing outline 29 with the two-dimensional outline produced in FIG. 14 wear can be determined by comparing cup 23 and ball 24 with a cup and ball generated from the virtual three-dimensional model. Migration of a prosthesis with respect to a bone may also be determined by comparing outline as generated in FIG. 14 with an outline generated by the method shown in FIG. 15.

The above method may also be used to simulate joint kinematics, in image guided surgery, in robotic surgery, to monitor changes in plastic surgery and in a range of other medical applications. In robotic surgery image information may be obtained during a surgical procedure using a CT scan, x-ray etc. with robotic actuators performing the surgical procedure.

It has been found that the above method can be implemented on a personal computer and is capable of performing correlation and an assessment of wear or migration within a few minutes. The speed within which image processing can be performed opens up a wide range of applications for which such image processing has traditionally required a prohibitive amount of processing power.

Whilst the invention has been described in relation to medical applications it will be appreciated that the techniques described above are also applicable to industrial image processing and in particular to machine vision applications. Where robots having stereoscopic vision are used distance information may be acquired to scale images. Distance information may alternatively be acquired by other distance finding techniques such as ultrasonic techniques etc. Where a body is illuminated by structured light detailed three-dimensional information may be acquired to assist in image processing.

While the present invention has been illustrated by the description of the embodiments thereof, and while the embodiments have been described in detail, it is not the intention of the Applicants to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicants' general inventive concept.

What we claim is:

1. A method of correlating a two dimensional representation of a body to a three dimensional representation of the body using a computer comprising:
   i. acquiring a two dimensional representation of the body;
   ii. generating, by the computer, a fitness function for the two dimensional representation;
   iii. determining, by the computer, two dimensional outlines of the three dimensional representation of the body for a plurality of sets of three dimensional position and orientation values, the two dimensional outline of the three dimensional body is determined using ray tracing from the origin of the position and orientation values, the origin being outside of the three dimensional representation;
   iv. comparing, by the computer, the two dimensional outlines to the fitness function to generate measures of fit for each set of three dimensional position and orientation values;
   v. breeding, by the computer, new sets of position and orientation values using a genetic algorithm; and
   vi. repeating steps iii to v until the measure of fit converges to an acceptable solution where the two dimensional representation of the body is correlated to the three dimensional representation of the body.

2. A method as claimed in claim 1 wherein the fitness function is based on the outline of the acquired two dimensional representation.

3. A method as claimed in claim 2 wherein the fitness function is related to distance from the outline of the acquired two dimensional representation.

4. A method as claimed in claim 1 wherein ray tracing is performed around the perimeter of the three dimensional representation to generate a two dimensional outline of the three dimensional representation.

5. A method as claimed in claim 4 wherein the first pixel of the two dimensional outline is obtained by moving outwardly from within the three dimensional representation to an edge of the model.

6. A method as claimed in claim 5 wherein subsequent pixels of the two dimensional array are determined by ray tracing adjacent pixels to the last pixel determined.

7. A method as claimed in claim 1 wherein the position of the three dimensional representation is determined by x, y, z values and the orientation is determined by $x_r$, $y_r$, $z_r$ values.

8. A method as claimed in claim 7 wherein a plurality of sets of x, y, z, $x_r$, $y_r$ and $z_r$ values are randomly generated.

9. A method as claimed in claim 5 wherein a plurality of sets of x, y, z, $x_r$, and $z_r$ values are selected from random values within given ranges.

10. A method as claimed in claim 1 wherein a plurality of two dimensional representations are acquired and used to create the fitness function.

11. A method as claimed in claim 1 wherein a string is generated from which the plurality of sets of three dimensional position and orientation values are generated.

12. A method as claimed in claim 11 wherein the string is generated using a random number generator.

13. A method as claimed in claim 1 wherein in the breeding step sets of position and orientation values are sorted from fittest to poorest based on comparison with the fitness function.

14. A method as claimed in claim 13 wherein the fittest position and orientation values are selected in the breeding step.

15. A method as claimed in claim 13 wherein a proportion of the fittest position and orientation values and a proportion of random values are selected in the breeding step.

16. A method as claimed in claim 13 wherein the position and orientation values are selected randomly in the breeding step with selection weighted towards the fittest values.

17. A method as claimed in claim 13 wherein a proportion of the best fitting position and orientation values are selected in the breeding step.

18. A method as claimed in claim 17 wherein a proportion of the less fit values are selected in the breeding step.

19. A method as claimed in claim 17 wherein the remaining values are selected randomly.

20. A method as claimed in claim 1 wherein an acceptable solution is achieved when the position and orientation values are stable for several iterations.

21. A method as claimed in claim 1 wherein an acceptable solution is achieved when an allowed amount computational processing has been expended.

22. A method as claimed in claim 1 wherein mutation of the position and orientation values is increased if the measure of fit remains below a threshold level for a prescribed period.

23. A method as claimed in claim 1 wherein some of the fittest position and orientation values are used in each successive iteration.

24. A method as claimed in claim 1 wherein the correlated representations are compared to assess wear.

25. A non-transitory computer-readable storage medium with an executable program stored thereon, wherein the program instructs a computer to perform the method of claim 1.

26. A method as claimed in claim 1 wherein the body to be correlated is a prosthesis.

27. A method as claimed in claim 26 wherein the three dimensional representation of the prosthesis is of the prosthesis at an earlier time period than the two dimensional representation and wherein the method includes the step of displaying the two dimensional representation and the correlated two dimensional representation of the earlier three dimensional representation to a user for the user to assess wear.

28. A method as claimed in claim 27 wherein the two dimensional representation is acquired from a capture device selected from the group comprising a CT scanner, a x-ray machine and one or more cameras and wherein the three dimensional representation is a virtual model of the prosthesis as manufactured.

29. A method as claimed in claim 26 wherein the three dimensional representation of the prosthesis is of the prosthesis at an earlier time period than the two dimensional representation and wherein the method includes the step of accessing wear of the prosthesis by comparing the latter two dimensional representation to the correlated two dimensional representation of the earlier three dimensional representation.

30. A method as claimed in claim 29 wherein the two dimensional representation is acquired from a capture device selected from the group comprising a CT scanner, a x-ray machine and one or more cameras and wherein the three dimensional representation is a virtual model of the prosthesis as manufactured.

31. A computer system for correlating a two dimensional representation of a body to a three dimensional representation of the body comprising:
   a. input means for acquiring a two dimensional representation of the body; and
   b. processor that:
      i. generates a fitness function for the two dimensional representation;
      ii. determines a two dimensional outline of the three dimensional representation of the body for a first set of three dimensional position and orientation values, the two dimensional outline of the three dimensional body is determined using ray tracing from the origin of the position and orientation values, the origin being outside of the three dimensional representation;
      iii. compares the two dimensional outline to the fitness function to generate a measure of fit;
      iv. breeds new position and orientation values using a genetic algorithm; and
      v. repeats steps iii to v until the measure of fit converges to an acceptable solution where the two dimensional representation of the body is correlated to the three dimensional representation of the body.

32. A system as claimed in claim 31 including a two dimensional image capture device to capture the two dimensional representation.

33. A system as claimed in claim 31 wherein the two dimensional image capture device is an x-ray machine.

34. A system as claimed in claim 31 wherein the two dimensional image capture device is one or more camera.

35. A system as claimed in claim 31 wherein the two dimensional image capture device is a stereoscopic vision system.

36. A system as claimed in claim 31 wherein the two dimensional image capture device is an ultrasonic imaging device.

37. A method of correlating a first representation of an object to a second representation of the object using a computer comprising:
   i. acquiring a first representation of the object;
   ii. generating, by the computer, a fitness function for the first representation;
   iii. for a first set of position and orientation values determining an outline of the second representation of the object, the two dimensional outline of the second representation of the object is determined using ray tracing from the origin of the position and orientation values, the origin being outside of the second representation of the object;
   iv. comparing, by the computer, the outline to the fitness function to generate a measure of fit;
   v. generating, by the computer, new position and orientation values based on the first set of position and orientation values and the measure of fit; and
   vi. repeating steps iii to v until the measure of fit converges to an acceptable solution where the first representation of the object is correlated to the second dimensional representation of the object.

* * * * *

UNITED STATES PATENT AND TRADEMARK OFFICE
CERTIFICATE OF CORRECTION

| | | Page 1 of 1 |
|---|---|---|
| PATENT NO. | : 8,659,591 B2 | |
| APPLICATION NO. | : 12/438721 | |
| DATED | : February 25, 2014 | |
| INVENTOR(S) | : Peter Devane | |

It is certified that error appears in the above-identified patent and that said Letters Patent is hereby corrected as shown below:

On the Title Page, in Item [56] under Other Publications, at line 1, please delete "Algotithm" and insert --Algorithm--.

On the Title Page, in Item [56] under Other Publications, at line 3, please delete "usingGenetic" and insert --using Genetic--.

In the Claims

Column 7, Claim 9, line 26, please delete "$x_r$, and $z_r$" and insert --$x_r$, $y_r$ and $z_r$--.

Column 8, Claim 29, lines 25 and 26, please delete "accessing" and insert --assessing--.

Signed and Sealed this
First Day of July, 2014

Michelle K. Lee
*Deputy Director of the United States Patent and Trademark Office*